United States Patent
Wieting

(10) Patent No.: US 8,033,505 B2
(45) Date of Patent: Oct. 11, 2011

(54) AIRCRAFT DOOR WINDOW

(75) Inventor: Jens Wieting, Bremen (DE)

(73) Assignee: Airbus Deutschland GmbH (DE)

( * ) Notice: Subject to any disclaimer, the term of this patent is extended or adjusted under 35 U.S.C. 154(b) by 732 days.

(21) Appl. No.: 12/148,127

(22) Filed: Apr. 16, 2008

(65) Prior Publication Data

US 2008/0265096 A1 Oct. 30, 2008

(30) Foreign Application Priority Data

Apr. 18, 2007 (DE) .................. 10 2007 018 279

(51) Int. Cl.
*B64C 1/14* (2006.01)
(52) U.S. Cl. .................................................. 244/129.3
(58) Field of Classification Search ............... 244/129.3; 359/726, 742, 822
See application file for complete search history.

(56) References Cited

U.S. PATENT DOCUMENTS

| | | | |
|---|---|---|---|
| 3,429,530 A * | 2/1969 | Hertel | 244/129.3 |
| 4,439,021 A * | 3/1984 | Gross | 359/726 |
| 5,680,261 A * | 10/1997 | Furst | 359/822 |
| 6,452,731 B1 * | 9/2002 | Schorning | 359/742 |
| 6,592,077 B2 * | 7/2003 | Uhlemann et al. | 244/129.3 |

FOREIGN PATENT DOCUMENTS

| | | |
|---|---|---|
| DE | 19706043 A1 | 6/1998 |
| EP | 1188664 | 3/2002 |

OTHER PUBLICATIONS

Office Action from German Application No. 102007018279-22, dated Oct. 11, 2010.

* cited by examiner

*Primary Examiner* — Galen Barefoot
(74) *Attorney, Agent, or Firm* — Lerner, David, Littenberg, Krumholz & Mentlik, LLP

(57) ABSTRACT

An airplane door window of a passenger plane, includes an outer pane, an inner pane, an intermediate pane situated parallel between the outer pane and inner pane and designed as an optical lens body for the inspection of impact surfaces for emergency slides, portable staircases or boarding fingers. The outer pane and the inner pane are spaced apart from each other, arranged substantially parallel to each other in a continuous window gasket, and form an intermediate space. The intermediate pane is inserted into a continuous groove of the window gasket, and extends essentially parallel to the outer pane and the inner pane over a partial area of the intermediate space.

7 Claims, 3 Drawing Sheets

AIRCRAFT DOOR WINDOW

BACKGROUND OF THE INVENTION

The invention relates to an airplane door window for a passenger plane, with an outer pane, an inner pane, an intermediate pane situated parallel between the outer pane and inner pane and designed as an optical lens body, and a continuous window seal.

Such airplane door windows are known from EP 1 188 664 A2, for example. Disclosed therein is an airplane door window with an outer pane and an inner pane, which are sealed airtight relative to a window frame at the support points, and an intermediate pane arranged in between parallel to the outer pane and inner pane. The intermediate pane is there designed as an optical lens body in the form of a Fresnel lens. Such an airplane door window with corresponding visual aids is necessary, since safety regulations prescribe that, after an emergency landing, the impact area for emergency slides, the staircase joined to the aircraft before opening the airplane door, or a board finger be visible to passengers.

A Fresnel lens arranged on the airplane door window is helpful for this purpose, since the airplane door window usually lies in a fuselage section above the centerline bend in the aircraft fuselage, so that it is directed upward, and outside areas below the airplane fuselage can only be viewed with difficulty form inside. A Fresnel lens facilitates the view of lower-lying areas, wherein the Fresnel lens is distinctly more lightweight than prisms, complicated mirror mechanisms or complete lens systems also known in prior art for implementing the mentioned safety regulations.

In the known airplane door window, there may be cases where cabin pressure may place a burden on the Fresnel lens designed to cover the most possible surface between the usually circular outer pane and circular inner pane, impairing the integrity of the lens and lens attachment underneath. In addition, the circular, bull's eye design of known airplane door windows often limits the visual field.

SUMMARY OF THE INVENTION

In one exemplary embodiment of the invention, the outer pane and inner pane are essentially oval, the outer pane and inner pane are spaced apart from each other, and arranged essentially parallel to each other in the window gasket, and form an intermediate space. In addition, the intermediate pane is inserted in a continuous groove of the window gasket, and extends essentially parallel to the outer pane and the inner pane over a partial area of the intermediate space.

The oval configuration of the airplane door window may be especially advantageous, since the visual field is distinctly enlarged by comparison to the usual, bull's eye shaped airplane door windows, and the image is adjusted to the passenger window. The optical visual aid for inspecting areas located underneath the airplane does not extend over the entire window surface, but only takes up as much space as needed. For example, use of the lower half of the window surface may be especially advantageous in oval windows. This not only saves on weight, but may also prevent cabin pressure in the airplane from exerting a load on the intermediate pane, since enough space is provided between the intermediate pane, the gasket, the outer pane and the inner pane for purposes of pressure compensation. The lack of attachment means, such as adhesives, both economizes on weight and may reduce wear on the material of the intermediate pane, while also improving the optical properties. Therefore, it may be particularly advantageous to secure the intermediate pane by inserting it into a continuous gasket.

This may make it possible to simultaneously achieve a good visual range, a low weight and a service life corresponding to the operational longevity of the airplane.

BRIEF DESCRIPTION OF THE DRAWINGS

The invention will be described in greater detail below based on the figures. The figures use the same reference numbers to denote identical objects.

DETAILED DESCRIPTION

Figure 1:
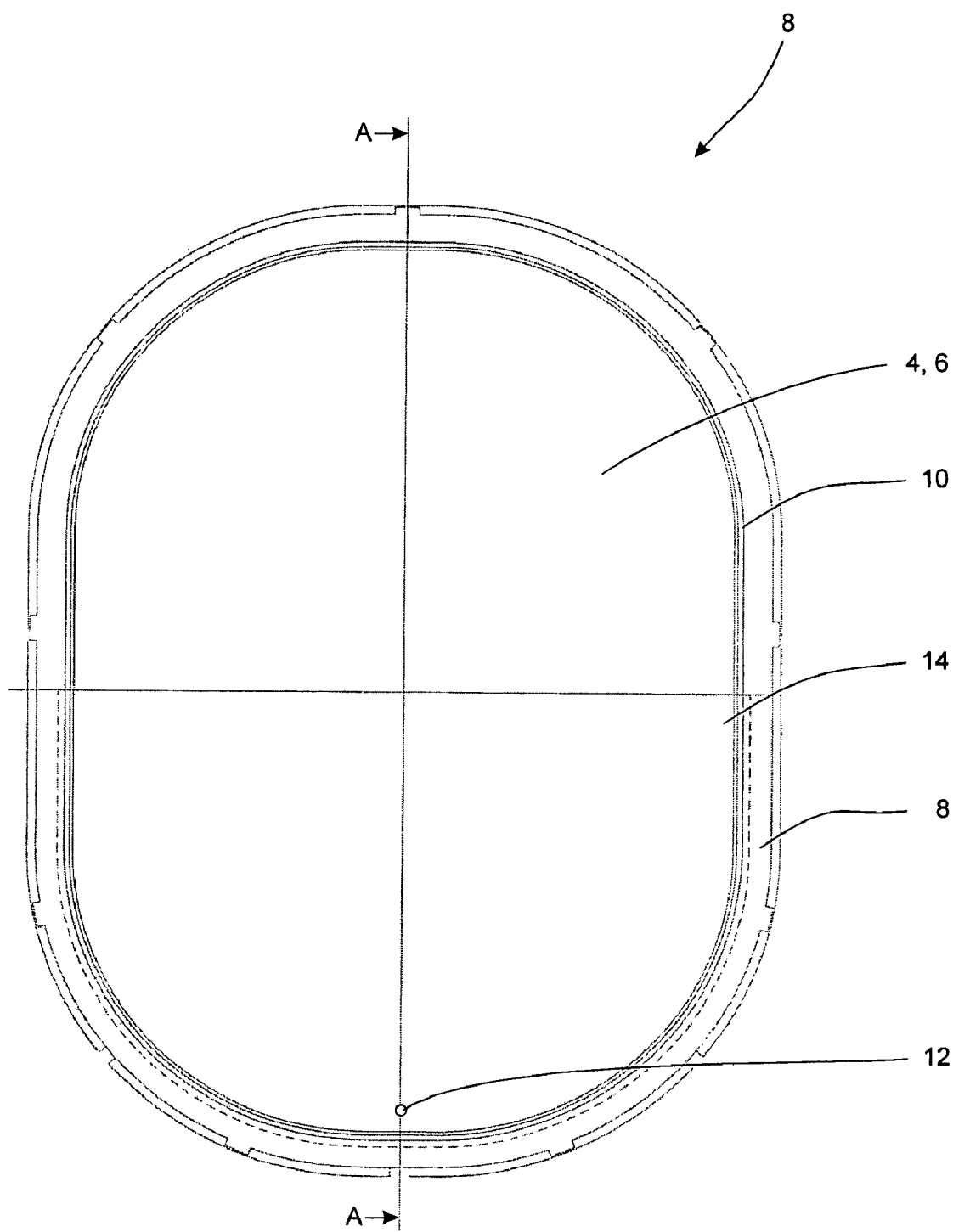
FIG. 1 is a top view of an airplane door window according to the invention integrated into an airplane door.

FIG. 1 shows a top view of an airplane door window 2 according to the invention with an essentially oval shape. The oval shape provides a greater window surface by comparison to conventional circular airplane door windows. This makes the window front more uniform on the one hand, while an oval airplane door window 2 is more ergonomic on the other, since it provides the flight personnel with a distinctly greater viewing angle.

The airplane door window 2 has an outer pane 4 and an inner pane 6, the outer edges of which are each situated in a shared, continuous gasket 10 seated in a window frame 8. The gasket 10 seals the panes 4 and 6 airtight relative to the window frame 8, thereby maintaining a pressure gradient at the airplane door window 2 between the interior and exterior of the aircraft fuselage. The window frame 8 is in turn mechanically joined with a corresponding opening in the airplane door, and designed in such a way that the side of the window frame 8 facing outwardly to the environment of airplane forms an aerodynamically smooth surface with the airplane door and outer pane 4.

The structural design selected for the airplane door window 2 is a failsafe component according to valid safety regulations. The outer pane 4 here absorbs the full differential pressure between the airplane cabin and environment of the airplane during routine flight operations. The inner pane 6 incorporates a ventilation system in the form of a ventilation borehole 12 arranged on the lower area of the inner pane 6 shown on FIG. 1. The ventilation borehole 12 prevents the inner pane 6 from being exposed to the differential pressure during flight, which happens only given a failure of the outer pane 4, thereby allowing the plane to land safely at least one time.

Figure 2:
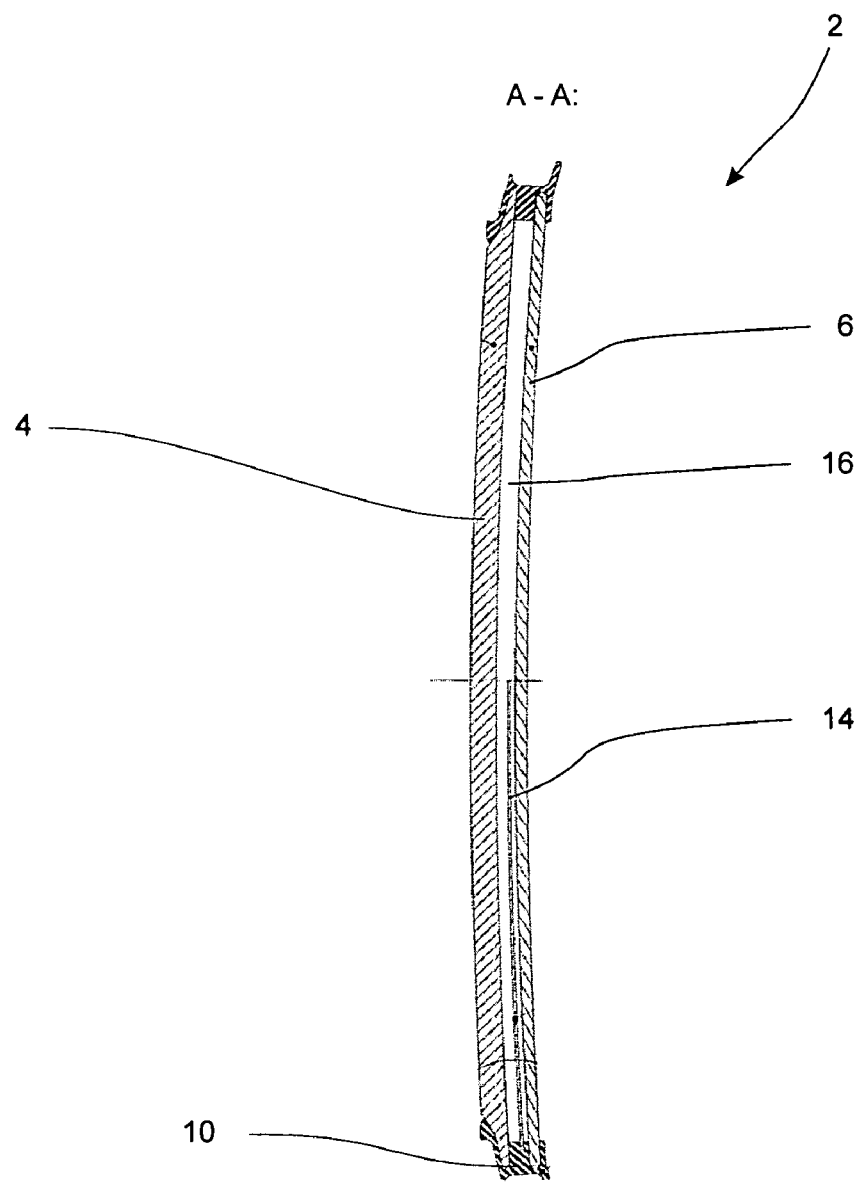
FIG. 2 is a side sectional view of the airplane door window.

Situated between the outer pane 4 and inner pane 6 is an intermediate pane 14 designed as an optical lens body and preferably made out of acrylic glass, which enables the inspection of impact surfaces for emergency slides, portable staircases or a boarding finger by enlarging the viewing field. The intermediate pane is here preferably designed as a Fresnel lens. The arrangement is shown in greater detail in the lateral section (A-A) depicted on FIG. 2.

As shown there, an intermediate space 16 is formed between the relatively thick outer pane 4 and thinner inner pane 6 in a manner typical for dual-pane configurations, wherein the intermediate pane 14 is plane-parallel to the outer pane 4 and inner pane 6. The intermediate pane 14 here extends upwardly from the lower edge of the gasket 10 as viewed in the drawing plane tightly along the inner pane 6 to about half the window height, for example. As a result, the intermediate pane 14 does not take up a large section of the intermediate space 16, specifically about half. The surface hence reached by the intermediate pane is sufficient for the intended application. By contrast, an oval airplane door window according to the invention makes available a distinctly larger window surface, which need not be completely occupied by an intermediate pane 14 to provide a correspondingly good view to the outside as in conventional airplane door windows. Since the intermediate pane 14 only extends over roughly half the height of the airplane door window, and roughly the upper half of the intermediate space 16 remains open, for example, the cabin pressure can be practically precluded from acting on the intermediate pane 14.

Figure 3:
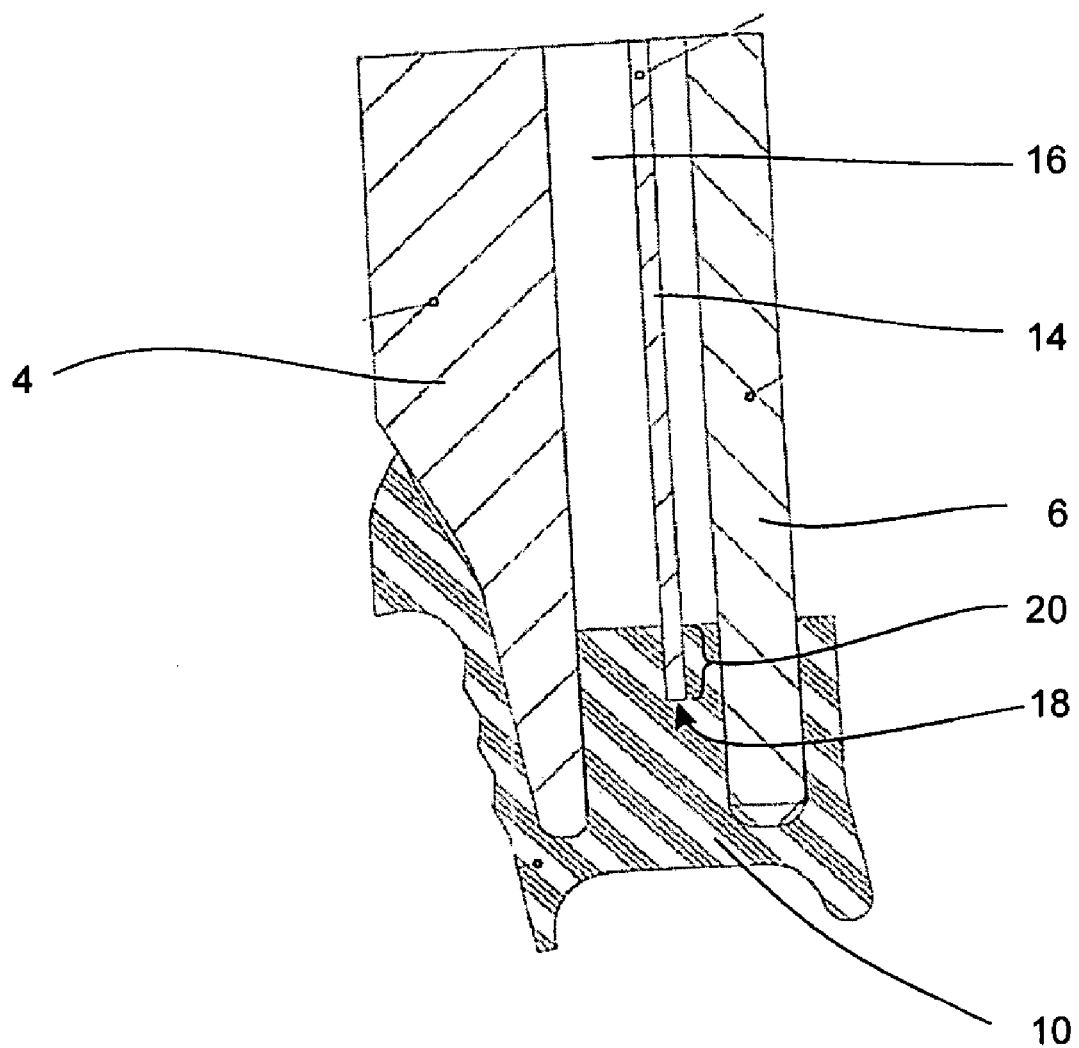
FIG. 3 is a side sectional view of the gasket of the airplane door window.

As further illustrated on FIG. 3, all planar elements of the airplane door window according to the invention sit in the shared gasket 10, which in turn is arranged in a window frame 8 (not shown). The attachment of the outer pane 4 and inner pane 6 is not relevant in terms of depicting the airplane door window according to the invention, and corresponds to that of conventional embodiments. However, the intermediate pane 14 is only mechanically inserted in a continuous groove 18 of the gasket 10 with its lateral and lower edge. No additional attachment means, e.g., adhesives, are used for attachment purposes. The intermediate pane 14 can be prevented from unintentionally detaching from the gasket 10 as the result of vibration or the like by making sure that the insertion depth 20 in the groove 18 is high enough, and hence that the static friction and clamping power are sufficient.

Various reasons preclude the adhesive bonding of the intermediate pane 14 to the outer pane 4, the inner pane 6 or the gasket 10. On the one hand, the optical properties of a system comprised of intermediate pane 14 and outer pane 4 or inner pane 6 would be deteriorated, since the pane adhesive causes an additional refraction of light passing through the airplane door window 2, as well as a loss in brightness and contrast. On the other hand, the fatigue limit of an adhesive bond with an intermediate layer 14 preferably comprised of acrylic glass will not reach a level reflecting the expected service life of the airplane, which is roughly 20 years. In the case of oriented acrylic glass, an adhesive bond would further detract from the material properties of the intermediate pane 14. As opposed to circular windows, a plug-in connection for the intermediate pane 14 also makes it possible to balance out the uneven stress distributions in an oval airplane door window 2 according to the invention.

The invention claimed is:

1. An airplane door window for a passenger plane, comprising:
    an outer pane,
    an inner pane,
    an intermediate pane situated parallel between the outer pane and inner pane and designed as an optical lens body, and
    a continuous window gasket,
wherein
    the inner pane and the outer pane are substantially oval in design,
    the outer pane and the inner pane are spaced apart and situated substantially parallel to each other in the window gasket, and form an intermediate space, and
    the intermediate pane is inserted in a continuous groove of the window gasket, and extends substantially parallel to the outer pane and the inner pane over a partial area of the intermediate space, such that a space is provided between the intermediate pane and the gasket for pressure compensation, such that no cabin pressure acts on the intermediate pane.

2. The airplane door window of claim 1, wherein the partial area of the intermediate space over which the intermediate pane extends lies in an area of between 25% and 75% of the surface of the outer pane.

3. The airplane door window of claim 1, wherein the partial area of the intermediate space over which the intermediate pane extends makes up substantially 50% of the surface of the outer pane.

4. The airplane door window of claim 1, wherein the intermediate pane is designed as a Fresnel lens.

5. The airplane door window of claim 1, wherein the intermediate pane is situated near the inner pane.

6. The airplane door window of claim 1, wherein the intermediate pane is inserted into the gasket to a sufficient insertion depth to secure the intermediate pane against detachment or slipping.

7. The airplane door window of claim 1, wherein the intermediate pane is made of transparent plastic.

* * * * *